United States Patent [19]

Hope

[11] Patent Number: 4,666,326
[45] Date of Patent: May 19, 1987

[54] REINFORCING BAR COUPLING SYSTEM

[75] Inventor: Paul F. Hope, Stockport, England

[73] Assignee: Metal Bond (Technology) Limited, Cheshire, England

[21] Appl. No.: 722,024

[22] Filed: Apr. 11, 1985

[51] Int. Cl.[4] .............................. B25G 3/00; F16D 1/00
[52] U.S. Cl. ........................................ 403/13; 403/265
[58] Field of Search ................. 403/13, 268, 267, 266, 403/265; 285/294, 296, 297, 292

[56] References Cited

U.S. PATENT DOCUMENTS

| 376,458 | 1/1888 | Wilbur | 285/294 |
|---|---|---|---|
| 647,996 | 4/1900 | Smith | 285/294 X |
| 1,689,281 | 10/1928 | Forssell | 403/265 |
| 1,951,512 | 3/1934 | Jewell | 285/297 X |
| 3,540,763 | 11/1970 | Yee | 403/265 |
| 3,989,281 | 11/1976 | Wilde, Jr. | 285/294 X |

FOREIGN PATENT DOCUMENTS

| 1028376 | 3/1978 | Canada | 285/297 |
|---|---|---|---|
| 1801577 | 5/1971 | Fed. Rep. of Germany | 403/267 |
| 58980 | 10/1923 | Sweden | 403/268 |

Primary Examiner—Andrew V. Kundrat
Attorney, Agent, or Firm—William A. Drucker

[57] ABSTRACT

The disclosure relates to a reinforcing bar coupling system wherein reinforcing bars or wire are coupled for structural concrete by applying to adjacent rod or wire portions a material, e.g. epoxy resin settable to form a structurally sound joint. The material is applied by injection into a sleeve surrounding the adjacent wire portions.

14 Claims, 4 Drawing Figures

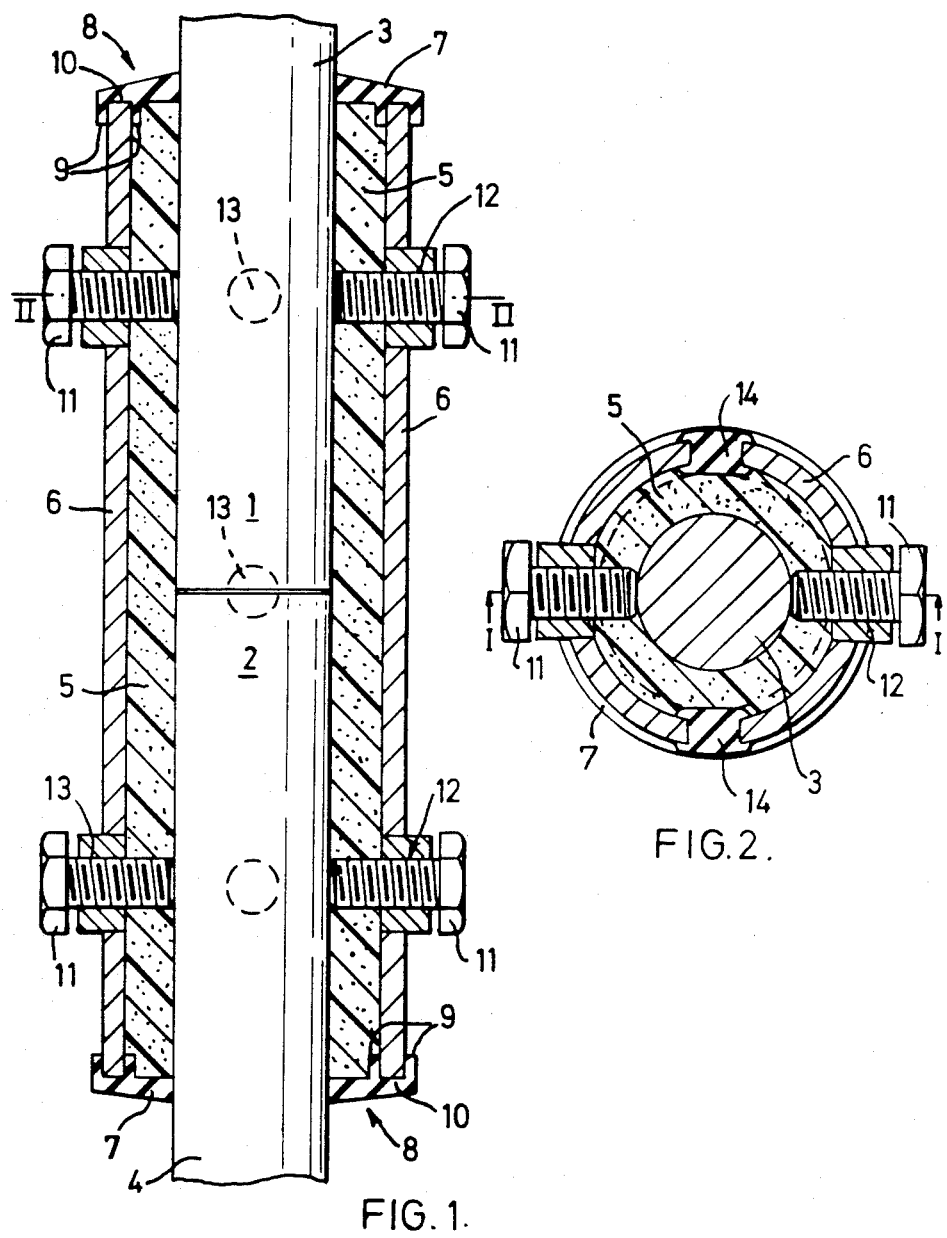

REINFORCING BAR COUPLING SYSTEM

This invention relates to coupling of reinforcing bars and is particularly but not exclusively concerned with end-coupling and fixing reinforcing bars, usually of steel, for use in structural concrete or the like.

Although coupling and fixing methods have been proposed, usually using steel components, for reinforcing bars in structural concrete, these methods tend to rely on, for example, threading of reinforcement bars and tapping the couplers, or swaging techniques. These methods have limited application and, because of the extra working etc. needed, they tend to be expensive and time-consuming.

The more traditional method of bending and wiring together of the reinforcing bars means that special personnel have to be used for bending and fixing operations. Furthermore, this method increases the amount of steel needed, especially where ends of bars are bent to achieve parallelism of overlapped bars at the connections, which leads to "bulking" of the steel in columns and beams and problems associated therewith. The design of reinforced concrete structures has to take into account the bulking of the steel, and, often a particularly design of reinforced concrete structure costs more than is necessary to achieve the strength of structure.

The present invention sets out to provide for coupling and fixing of reinforcing bars without end-bending and overlapping of bars in structural concrete or the like which substantially eliminates bulking of reinforcing bars and which consequently reduces the amount of materials needlessly used in columns, beams and walls and is simpler than prior proposed mechanical methods of coupling and fixing reinforcing bars. Overall, since the present invention does not rely on bending and wiring together of the reinforcing bars on screwing or swaging techniques, the cost is reduced, together with a reduced reliance on specialist personnel and/or equipment.

According to a first aspect of the invention, there is provided a method of coupling and fixing reinforcing bars or wires for use in structural concrete or the like comprising applying settable sleeving material to adjacent portions, usually involving ends of reinforcing bars where a junction is required or desired, said sleeving material forming by itself, or in combination with a material-retaining peripheral sleeve useful for injection of the sleeving material, a structurally sound joint between the abutting or confronting end portions of the reinforcing bars.

When in combination with a periophral sleeve fitting suitable injectable sleeving material may be introduced into the sleeve fitting via any of a plurality of holes, even valved ports, located in the sleeve fitting and also serving as sight holes for checking injection, the sleeve fitting having sealing means at each end portion to prevent loss of sleeving material.

The sleeve fitting may comprise locating means for centering and fixedly locating the adjacent end portions of the reinforcing bars relative to the sleeve. The centering means, which may be at least one combination of a threaded bolt and one of said plurality of holes adapted to receive said threaded bolt, may also serve to assist keying of the sleeving material. Angularly spaced such combinations are preferred.

The sleeve fitting may have other or additional keying means on its surface adjacent the sleeving material i.e., inner surface, which other keying means may also serve as means for centering the adjacent end portions of the reinforcing bars.

The other or additional keying or locating means may comprise stamped or moulded ribs or nibs extending longitudinally or transversely of the surface of the sleeve fitting adjacent the sleeving material. The ribs or nibs may have any desired cross-section, say rectangular or triangular and may taper along their length.

Locating and/or keying means may even comprise a plurality of separable ring or tube-like inserts, or the like, arranged within a said sleeve fitting, the rings or the like each having a diameter smaller than the diameter of the inner surface of the sleeve fitting but greater than the diameter of the reinforcing bars, and permitting one size of sleeve fitting to serve several sizes of reinforcing bar without waste of sleeving material.

The sleeve fitting which is preferably inert relative to the sleeving material may be made of metal or a suitable synthetic polymeric material. The sleeving material is preferably of a type that cures after application, for example an epoxy-type resin material such as "Seltite-Selfix (Registered Trademark) or cementing grout. The sleeving material may additionally comprise entrained fiber-material for additional strength.

In general, it is found that provision of a satisfactorily strong joint is readily achieved using the sleeving material proposals hereof in appropriate thickness for its strength characteristics so as to be of a joint-strength equivalent to the bar-strength. Using the specific epoxy resin materials mentioned herein indicates that a sleeving material thickness of about 5 mm. should suffice.

The sleeve fitting may comprise keying means also on its surface adjacent the structural concrete or the like i.e. outer surface. The keying means may serve to provide additional keying between the sleeve fitting and the concrete and may comprise a plurality of longitudinal or transverse ribs or grooves, or a plurality of dots or the like. The keying means may also comprise the sealing means at each end portion of the sleeve fitting, in fact, naturally occurring steps thereat and the greater diameter and thus surface area of the sleeve fitting itself (compared to the bar) may well be sufficient to give adequate keying to the concrete.

According to a second aspect of the present invention, there is provided a coupling sleeve fitting device for coupling and fixing reinforcing bars in adjacent, usually end-wise, relation for use in structural concrete or the like, which coupling sleeve fitting affords material retention, effectively as a mould, for an injectable sleeving material suitable for joining adjacent portions of reinforcing bars. Preferably, said sleeving material itself is capable of forming a structurally sound joint between the adjacent portions of the reinforcing bars, though the coupling sleeve fitting could contribute, if desired.

The invention will now be described by way of example with reference to the accompanying drawings, in which:

FIG. 1 is a longitudinal section of a joint formed between two reinforcing bars in end-to-end alignment and a coupling sleeve fitting of the invention, the section being along the line 1—1 of FIG. 2;

FIG. 2 is a cross-section through the line 11—11 of FIG. 1;

Figure 3:
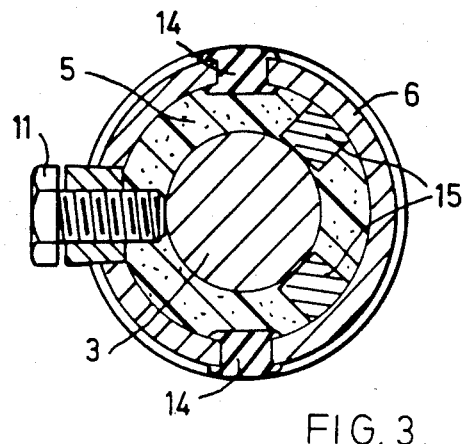
FIG. 3 is a cross-section through a further embodiment of a coupling sleeve fitting of the invention and one reinforcing bar.

FIG. 1 shows a joint between two adjacent, abutting or confronting end portions 1 and 2 of two reinforcing bars 3 and 4 respectively in end-to-end alignment. The joint is formed by the combination of a sleeving material 5 and a sleeve fitting 6.

The sleeve fitting 6, which is preferably inert relative to the sleeving material, is made of metal, such as mild steel, or a suitable synthetic polymeric material. The sleeve fitting can be made of various sizes and wall thicknesses, as well as in varying angles, such as 45° or 90° bends, tees, crosses, etc.

A seal or cap is arranged at each end of the sleeve fitting. The seal or cap 7 is shown snap- or push-fitted onto the sleeve fitting and held in place by a pair of spaced flanges 9 defining a circular groove 10. The seal or cap 8 is pierced to enable a reinforcing bar to pass therethrough (as shown in FIG. 1). The seal or cap is preferably a grommet made of rubber or a synthetic polymeric or elastomeric material. However, other closures could be used, say of putty-like materials or plasticine.

The sleeve fitting is placed in position around the two reinforcing bars, which can be of any known type, such as ribbed or plain bars. The sleeve fitting has means for centering and fixedly locating the adjacent end portions 1 and 2 of the two reinforcing bars relative to the sleeve. The centering and locating means are a plurality of screws or threaded bolts 11 which engage threaded holes 12 in the sleeve fitting and pass therethrough to abut the reinforcing bars within the sleeve fitting.

The sleeving material 5 is injected into the sleeve fitting through at least one of strategically placed injection or application holes or valved ports 13, which can be the threaded holes 12 used for the centering and locating screws or threaded bolt. The sleeving material is preferably an epoxy-type resin material, such as "Seltite-Selfix" (Registered Trademark), or a cementing grout. The sleeving material may additionally comprise an entrained fiber for additional bonding strength.

Any air which is trapped within the sleeve fitting is allowed to escape via bleed holes which in practice are others of the holes or valved ports 13. Furthermore, the bleed holes are used to check that the sleeving material has filled completely the sleeve fitting.

Once the sleeve fitting has been filled with the sleeving material, the holes or valved ports 13 can be sealed by, for example, rubber or synthetic polymeric or elastomeric material grommets 14 (as shown in FIG. 2), though such may not be necessary in practice.

The joint shown in FIGS. 1 and 2 has the reinforcing bars centered within the sleeve fitting by a pair of screws or threaded bolts 11 engaging a respective end portion 1 or 2 of the reinforcing bars. The pair of screws provides a strong grip and ensures that the sleeve fitting is fixedly located relative to the reinforcing bars.

However, it has been found possible to use one screw or threaded bolt in combination with, for example, a pair of spaced ribs or nibs 15 (as shown in FIG. 3). One screw or threaded bolt permits a quicker release of the sleeve from the reinforcing bars, than if two screws or threaded bolts were present. It is even feasible simply to use three or more ribs or nibs that taper towards ends of the sleeve fitting, though positive grip via screw clamping will normally greatly assist any desired and practical extent of "dry-building" of reinforcing, i.e. prior to concrete pouring.

It is also feasible for such ribs or nibs 15 to be on inserts for the sleeve fittings, or even for such inserts to be plain as the inserts would enable one size of sleeve fitting to service different sizes of reinforcing wire without waste of injected material beyond a thickness required to give adequate strength, say 5 mm. over the rod/wire radius. The above mentioned ribs or nibs can have any desired cross-section, and the above mentioned inserts could be spaced rings if desired.

The screws or threaded bolts will, of course, also serve to assist keying between the sleeving material and the inner surface of the sleeve fitting.

It is possible for the exterior surface of the sleeve fitting to have a plurality of longitudinal or transverse ribs or grooves or dots or the like to assist keying between the concrete and the sleeve. However, this may be unnecessary, as the sleeve fitting has a greater surface area for keying than that of the reinforcing bars. Also, steps at the seals or caps 7 assist the keying between the sleeve fitting and the concrete.

The invention has been described with reference to the combination of the sleeving material and the sleeve fitting. It is however possible, actually normal, for the sleeving material considered by itself to provide all required strength of the joint between adjacent end portions of the reinforcing bars. In either of the two above joints, the invention provides a structurally sound joint. The strength of a joint formed in accordance with the invention is either dependent on the outer sleeve fitting or the inner sleeving material, or just the inner sleeving material. If, however, the outer sleeve fitting is strong enough, the joint can be reliably dry built.

The epoxy-type resin material can be used with rusted bars, and the bars do not require coating with a rust converter or the like.

The invention can be used on a single coupling between two reinforcing bars, or on large configurations of reinforcing bars before final fixing with the resin material or cementing grout.

The composition of the sleeving material can be adjusted to vary the setting times, either for flash sets of only a few minutes or slower sets of a few hours.

Figure 4:
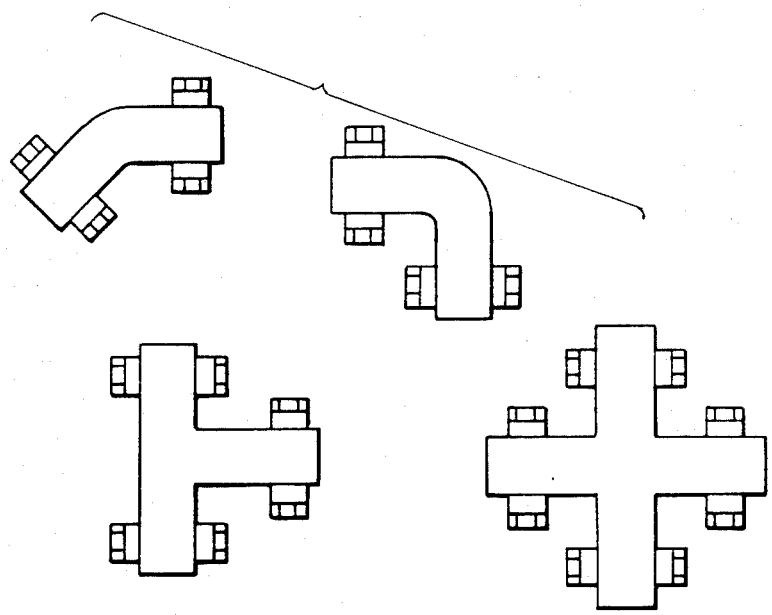
FIG. 4 shows other shapes of coupling.

FIG. 4 shows couplings with 45° and 90° bends, in flat-T formation, cross-formation, and corner-T formation. If desired, of course, five-or six-branch couplings can be provided. Moreover, where any joint for reinforcing rods/wires where an end of one of the latter meets what could be a continuous run, aligned passages of the coupling could permit it simply to be slid over such a continuous rod or wire.

What is claimed is:

1. A method of coupling reinforcing bars or wires for subsequent embedment in concrete for structural purposes, the method comprising applying about adjacent bar or wire portions at a desired joint or junction thereof settable material which material is applied within a material-retaining sleeve having spacing means for its fitting about said portions in spaced relation thereto, said spacing means comprising for each portion radially spaced engagers, one of which for each portion is positively adjustable through the side wall of the sleeve and others comprise radial ribs and wherein at emplacement the sleeve is centered relative to each of said portions to be jointed by adjustment of said positively adjustable engagers to cause said portion to abut said other engagers, and when said material is caused or allowed to set affords a structurally sound joint between and over said adjacent portions.

2. A method according to claim 1 wherein, after emplacement but before injection, the sleeve fitting is end-capped relative to the wires or rods and injection is then via at least one side aperture in the fitting with air-escape and sight checking of injection at at least another side aperture in the fitting.

3. A method according to claim 1 wherein the centering means of the positively adjustable engager comprises adjustment of bolts in threaded bores in side walls of the fitting.

4. A method according to claim 2 wherein centering by means of the positively adjustable engager comprises adjustment of bolts in threaded bores in side walls of the fitting.

5. A coupling fitting for reinforcing bars or wires for structural concrete in making joints comprising a sleeve-like mold device for settable sleeving material to form the desired joint, said sleeve-like mold device having means for locating it over and about portions of said bars or wires adjacent said desired joint with a clearance to said bar or wire portions, wherein the means for locating comprises for each portion engagers at radial spacings relative to axes of bars or wires to be joined, one of which engagers for each portion is positively adjustable through the side walls of the device and the other engagers comprise radially spaced ribs, injection access means to said clearance for application of said sleeving material, and air-escape/injection sighting means relative to said clearance.

6. A coupling fitting according to claim 5 wherein the positively adjustable engagers comprise bolts through threaded bores in side walls of the device.

7. A coupling fitting according to claim 5 having end caps for the fitting relative to encompassed portions of said bars or wires.

8. A coupling fitting according to claim 6 having end caps for the fitting relative to encompassed portions of said bars or wires.

9. A coupling fitting according to claim 5 wherein the fitting is exteriorly formed to aid keying to concrete when the latter is cast thereabout.

10. A coupling fitting according to claim 6 wherein the fitting is exteriorly formed to aid keying to concrete when the latter is cast thereabout.

11. A coupling fitting according to claim 7 wherein the fitting is exteriorly formed to aid keying to concrete when the latter is cast thereabout.

12. A coupling fitting according to claim 8 wherein the fitting is exteriorly formed to aid keying to concrete when the latter is cast thereabout.

13. A coupling device according to claim 5 wherein the radially spaced ribs comprise two longitudinal ribs.

14. A coupling fitting for reinforcing bars or wires for structural concrete in making joints comprising a sleeve-like mold device for settable sleeving material to form the desired joint, said sleeve-like mold device having means for locating it over and about portions of said bars or wires adjacent said desired joint with a clearance to said bar or wire portions, injection access means to said clearance for application of said sleeving material, and air-escape/injection sighting means relative to said clearance, a coupling fitting wherein the means for locating comprises bolts through threaded bores in side walls of the device at radial spacings relative to axes of bars or wires to be jointed and a coupling fitting wherein the other of the engagers comprise radially spaced longitudinal ribs.

* * * * *